United States Patent
Neukam et al.

(10) Patent No.: US 11,002,419 B2
(45) Date of Patent: May 11, 2021

(54) LINEARLY POLARIZED LIGHT EMISSION BY A VEHICLE HEADLIGHT FOR USE IN A CAMERA-BASED DRIVER ASSISTANCE SYSTEM

(71) Applicant: Audi AG, Ingolstadt (DE)

(72) Inventors: Johannes Neukam, Pegnitz (DE); Philipp Ansorg, Ingolstadt (DE)

(73) Assignee: Audi AG, Ingolstadt (DE)

( * ) Notice: Subject to any disclaimer, the term of this patent is extended or adjusted under 35 U.S.C. 154(b) by 375 days.

(21) Appl. No.: 16/303,643

(22) PCT Filed: May 22, 2017

(86) PCT No.: PCT/EP2017/062268
§ 371 (c)(1),
(2) Date: Nov. 20, 2018

(87) PCT Pub. No.: WO2017/202769
PCT Pub. Date: Nov. 30, 2017

(65) Prior Publication Data
US 2019/0331308 A1   Oct. 31, 2019

(30) Foreign Application Priority Data

May 24, 2016  (DE) .......................... 102016006326.2

(51) Int. Cl.
*B60Q 1/00* (2006.01)
*F21S 41/141* (2018.01)
(Continued)

(52) U.S. Cl.
CPC .............. *F21S 41/141* (2018.01); *B60Q 1/04* (2013.01); *F21S 41/135* (2018.01); *F21S 41/16* (2018.01); *B60R 2300/103* (2013.01)

(58) Field of Classification Search
CPC ........ B60Q 1/04; F21S 41/135; F21S 41/141; F21S 41/16
See application file for complete search history.

(56) References Cited

U.S. PATENT DOCUMENTS 6,465,787 B1 * 10/2002 Coulter .................. G02B 27/28
250/341.3
7,733,464 B2 * 6/2010 David .................... G02B 23/12
356/5.03
(Continued)

FOREIGN PATENT DOCUMENTS

DE   102008002553 A1   12/2009
DE   102009026463 A1   12/2010
(Continued)

OTHER PUBLICATIONS

International Search Report and Written Opinion of the International Searching Authority directed to related International Patent Application No. PCT/EP2017/062268, dated Nov. 27, 2017, with attached English-language translation; 24 pages.

(Continued)

*Primary Examiner* — Gerald J Sufleta, II
(74) *Attorney, Agent, or Firm* — Sterne, Kessler, Goldstein & Fox P.L.L.C.

(57) ABSTRACT

This disclosure relates to a driver assistance system for a motor vehicle comprising a vehicle headlight, which is designed to illuminate the surroundings of the motor vehicle, and an image capture unit, which is designed to evaluate light having a pre-definable first polarization direction for generating image data as a function of the surroundings of the motor vehicle. The vehicle headlight is designed, during normal operations, in which a pre-definable light output is provided by the vehicle headlight, according to a pre-definable modulation pattern and/or with a pre-definable portion of the light output, to generate linearly polarized (Continued)

light with a second polarization direction to provide lighting for the surroundings. In addition, this disclosure relates to a motor vehicle with such a driver assistance system and a corresponding method.

21 Claims, 3 Drawing Sheets

(51) Int. Cl.
*F21S 41/135* (2018.01)
*F21S 41/16* (2018.01)
*B60Q 1/04* (2006.01)

(56) References Cited

U.S. PATENT DOCUMENTS

| | | | | |
|---|---|---|---|---|
| 7,925,440 B2* | 4/2011 | Allen | ................... | G07B 15/063 |
| | | | | 701/300 |
| 8,031,227 B2* | 10/2011 | Neal | ......................... | G01S 5/16 |
| | | | | 348/169 |
| 8,125,630 B2* | 2/2012 | Wood | ...................... | G01S 17/66 |
| | | | | 356/139.09 |
| 8,135,614 B2* | 3/2012 | Allen | ..................... | G08G 1/015 |
| | | | | 705/13 |
| 8,331,621 B1* | 12/2012 | Allen | ..................... | G08G 1/015 |
| | | | | 382/104 |
| 8,629,988 B2* | 1/2014 | Gribkov | .................. | G01S 7/499 |
| | | | | 356/622 |
| 8,908,038 B2* | 12/2014 | Li | ........................ | G06K 9/3233 |
| | | | | 348/148 |
| 9,187,063 B2* | 11/2015 | Hirai | ..................... | B60S 1/0844 |
| 9,317,754 B2* | 4/2016 | Hirai | ...................... | G06T 7/136 |
| 2018/0234602 A1* | 8/2018 | Li | ......................... | G02B 27/283 |
| 2018/0309535 A1* | 10/2018 | Nakamura | .............. | H04J 14/02 |

FOREIGN PATENT DOCUMENTS

| | | |
|---|---|---|
| DE | 202012001196 U1 | 6/2012 |
| DE | 102012018121 A1 | 4/2013 |
| DE | 102013207148 A1 | 11/2013 |
| DE | 102013005083 A1 | 9/2014 |
| DE | 102013220250 A1 | 9/2014 |
| DE | 102014205204 B3 | 5/2015 |
| EP | 0490029 A2 | 6/1992 |
| EP | 1351015 A2 | 10/2003 |
| WO | WO 2015/063512 A1 | 5/2015 |

OTHER PUBLICATIONS

International Preliminary Report on Patentability directed to related International Patent Application No. PCT/EP2017/062268, dated Sep. 20, 2018, with attached English-language translation; 15 pages.

\* cited by examiner

LINEARLY POLARIZED LIGHT EMISSION BY A VEHICLE HEADLIGHT FOR USE IN A CAMERA-BASED DRIVER ASSISTANCE SYSTEM

TECHNICAL FIELD

This disclosure relates to a system, motor vehicle, and method for linearly polarized light emissions by a vehicle headlight for use in a camera-based driver assistance system.

BACKGROUND

In modern motor vehicles, particularly including motor vehicles with internal combustion engines and/or electric motors, the recognition of the environment by computer-based assistance systems is playing an increasingly important role. Sensor data of various kinds are evaluated as a basis for the creation of a three-dimensional virtual model of the real environment. This includes, in addition to GPS data, infrared and ultrasound sensor data, and, above all, image data that is produced by an image capture unit, which usually manifests as a 2D camera and which performs a scan in the visible wavelength range. Especially in the direction of travel, aligned camera systems benefit here from the improved illumination through the existing headlight systems of the motor vehicle. The visible light spectrum of the headlight clearly increases the accuracy of the camera detection, but reduces the quality of the images in fog and similar poor visibility, because the particles in the air reflect the emitted light and thus worsen the image.

According to the current state of the art, the illumination of the camera field of view is largely carried out by the headlights of the motor vehicle. In this case, great care is taken to minimize the glare for the driver in the event of fog. Since the high light intensity of the high beam in the fog leads to reflections, modern motor vehicles provide additional fog lights whose function is optimized to illuminate the road without blinding the driver. For this purpose, an area of the roadway is illuminated, which is not necessarily evaluated by built-in camera systems. These driver assistance systems encounter the same problems that a human driver faces, i.e., significant visibility deterioration in fog.

A program-controlled computing unit, for example, a microcontroller or a microprocessor, calculates the surroundings of the motor vehicle from the sensor input data. Reflections on wet pavement, and on reflective buildings and surfaces such as rear windows of other vehicles, increase the noise in the input data of the camera. A previously uniquely identifiable object can be difficult for a computer algorithm implemented using a computer program to recognize due to the superimposition of reflections. This noise distorts the signal of the image and introduces an element of uncertainty. Fog and water vapor at a mid-to-long distance (30 meters to 500 meters) make the contours of objects blurry. This makes it difficult for the driver assistance system to recognize patterns. The signal-to-noise ratio deteriorates, especially with increasing distance.

In this context, DE 10 2012 018 121 A1 discloses an image capture device for capturing images of the surroundings of a motor vehicle, comprising a stereo camera unit which has a first optical device for capturing images of the surroundings and a second optical device at a distance from the first optical device. One of the optical devices is assigned at least one polarizing filter element for at least partially absorbing light. The one of the optical devices is arranged and adjustable between at least one use position in which the polarizing filter element is provided at least partially in a detection range of the one of the optical devices, and a non-use position, in which the polarizing filter element is provided outside the detection range of the one of the optical devices.

Moreover, DE 10 2014 205 204 B3 discloses a camera-based driver assistance system with a stereo camera having first and second image sensors for generating image data of the vehicle surroundings, in which the image data are evaluated by an image evaluation unit and a polarization filter is connected upstream of the second image sensor that transmits horizontally polarized light. The image evaluation unit is provided to compare the intensities of the frames of image data simultaneously generated by the first and second image sensors and to display the surface condition of the road taken by the stereo camera depending on the intensity ratio.

DE 10 2013 207 148 A1 proposes a light propagation time camera system comprising a light propagation time camera, which is designed to provide a preferred polarization of light, and a light, which is designed to emit polarized light.

BRIEF DESCRIPTION OF THE DRAWINGS/FIGURES

The accompanying drawings, which are incorporated herein and form part of the specification, illustrate the present embodiments and, together with the description, further serve to explain the principles of the present embodiments and to enable a person skilled in the relevant art(s) to make and use the present embodiments.

The features and advantages of the present embodiments will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

It is an object of this disclosure to propose a camera-based driver assistance system and a motor vehicle with such a driver assistance system and a corresponding method with which the accuracy of the image capture unit can be increased.

This disclosure relates to a driver assistance system for a motor vehicle, wherein the driver assistance system comprises a vehicle headlight, which is designed to illuminate the surroundings of the motor vehicle, and an image capture unit, which is designed to evaluate light in a pre-definable first polarization direction to generate image data as a function of the surroundings of the motor vehicle to be evaluated.

The vehicle headlight is designed, during normal operations, in which a pre-definable light output is provided by the vehicle headlight, according to a pre-definable modulation pattern and/or with a pre-definable portion of the light output, to generate linearly polarized light in a second polarization direction to provide lighting for the surroundings. Light output is understood in particular to be the luminous flux provided by the vehicle headlight. When referring to a solid angle, the light intensity can also serve as a reference. If the light sensitivity curve V ($\lambda$) (also called relative spectral light sensitivity level) is to be disregarded, the radiation power of the emitted light can be taken as the benchmark instead. Because, by using a polarization filter, the spectral composition of the filtered, i.e., polarized, light does not change, a differentiation between luminous flux and radiation output is not required at this point.

The modulation pattern may have a periodic profile, in particular with a pre-definable switched-on duration and a pre-definable switched-off duration. The provision of the linearly polarized light takes place during the respective switched-on duration, wherein at least part of the pre-definable light output is provided by non-polarized light during the remaining time, i.e., the respective switched-off duration. The ratio of the switched-on duration to the sum of the switched-on duration and the switched-off duration is referred to as a duty cycle. The duty cycle is preferably greater than 0 percent and less than 100 percent. The pre-definable proportion of the light output, which is provided by the linearly polarized light, is preferably greater than 0 percent. Regardless of the lower limit of the pre-definable component of the light output, the pre-definable component of the light output is less than or equal to 100 percent. Alternatively, the pre-definable proportion of the light output can be less than 100 percent.

The vehicle headlight is preferably a regulatory illumination device that radiates substantially in the direction of travel and that emits light, in particular in the visible wavelength range. The spectral composition of the emitted light results, in particular, in white light. Alternatively, the vehicle headlight may be configured to radiate primarily in a yellow spectral range.

The embodiments disclosed herein are based on the finding that, in the case of fog or water vapor in the atmosphere, reflections occur from the finely distributed water droplets, which tend to result in a rotation of the polarization plane of the reflected light relative to the radiated light. This effect can be utilized particularly advantageously in that linearly polarized light is emitted by the vehicle headlight and the reflected light is evaluated by an image capture unit, which is likewise provided with an upstream linear polarization filter. This can reduce the noise in the image signal, thereby improving the signal-to-noise ratio. The reduction of noise from image captures by the image capture unit (e.g., camera) minimizes the susceptibility to environmental data being supplied to the motor vehicle. Particularly with regard to autonomously driving motor vehicles, this provides a clear improvement in safety. The improved mapping of the surroundings prevents a misinterpretation of the surroundings by an evaluation algorithm, which is processed in a computer unit of the driver assistance system. To date, erroneous pattern recognition can lead to such misinterpretations, which are caused, for example, by glare, reflections, and/or opaqueness. With the aid of the embodiments disclosed herein, the perspective of the vehicle obtained by the driver assistance system is improved if there is fog and water vapor in the atmosphere.

Another advantage of the embodiments disclosed herein is that existing components of the motor vehicle can continue to be used. Only the installation of polarization filters in the beam path in front of the existing components, i.e., the vehicle headlight and image capture unit (e.g., camera), is necessary for retrofitting. The vehicle headlight thus has another function, which goes beyond the illumination of the road surroundings for the purpose of allowing recognizability of the road surroundings by a human being as the driver of the motor vehicle. By providing additional information about the structure of the road surroundings in the image data, which is provided in the form of linearly polarized light with a pre-defined polarization direction, the accuracy of the image capture unit increases. Thus, by reducing the noise, the signal generated by the image capture unit becomes more accurate. On the basis of this more accurate image data, image processing algorithms can create a more reliable modeling of the surroundings.

According to another advantageous embodiment of the driver assistance system, the second polarization direction is equal to the first polarization direction. As a result, the advantageous effect is produced that, for example, from a metallic surface—for example, a road sign or a preceding or oncoming motor vehicle—reflected light with the same polarization direction arrives at the image capture unit, in which it was emitted by the motor vehicle headlight. In contrast, the polarization direction tends to rotate on water droplets present in the atmosphere, so that the light, which is reflected on these droplets back to the image capture unit, plays a role in the creation of the image data only to a reduced extent, namely with a factor that is provided by the cosine of the angle from which the polarization direction rotates with respect to the first and second polarization directions. When the direction of polarization is rotated by 90 degrees, there is a total suppression of the interference signal.

According to a preferred embodiment of the driver assistance system, the image capture unit has a resolution of at least VGA resolution with at least 640×480 pixels. Increasingly preferred in the following order is also a resolution of at least 768×576 pixels (PAL-D); at least 800×600 pixels (SVGA); at least 1280×720 pixels (HD720 High Definition "HD Ready"); and at least 1920×1080 pixels (HD180 High Definition "Full HD"), for example. By means of the high resolution of the image capture unit, it is therefore advantageous to generate objects at a mid-to-long distance with sufficient mapping of the structures in the image data to enable a reliable and meaningful evaluation of the image data.

According to another advantageous embodiment of the driver assistance system, the image capture unit is designed to detect colors, in particular to distinguish between regulatory signal colors used in traffic light systems. These include in particular the colors red, green, and/or yellow and/or green, which are used as so-called traffic light colors in traffic signal traffic light systems, and/or blue. Because the image capture unit is designed to identify at least one of these colors beyond a doubt, especially the color red, the driver assistance system is able to follow during autonomous driving the signals triggered by the traffic light system. In an operation controlled by the driver, the driver assistance system is also alternatively able to indicate the signals triggered by the traffic light system to the light signal and is able to initiate appropriate measures in case the light signal is overlooked by the driver.

According to another advantageous embodiment of the driver assistance system, the image capture unit is designed as a mono-camera, in particular as the only camera for detecting the surroundings that can be illuminated by the vehicle headlight. As a result, the cost of the disclosed driver assistance system can be kept low.

According to another advantageous embodiment, the vehicle headlight comprises a first light source, which is designed to generate only non-polarized light. The light emitted from the first light source can be used to be emitted in addition to the linearly polarized light to compensate for the loss of light output, which is caused by a polarization filter. Alternatively or additionally, the first light source can be equipped with a polarization filter, which is provided in such a way that the portion of the light generated by the first light source, which leaves the vehicle headlight in a predetermined beam direction, must pass through the polarization filter. The polarization filter can thereby enable a variable polarization of the light. It can thus be provided that the entire light emitted by the vehicle headlight, namely the non-polarized light and the polarized light, is generated by a single light source, namely the first light source.

According to another advantageous embodiment, the vehicle headlight comprises a polarization device, which is designed to linearly polarize the light generated by the first light source in response to a polarization control signal. To achieve this, a static and stationary polarization filter can be provided, for example, which, through one or multiple mechanical elements, can be brought into the beam direction of the light source, which can, for example, be a piezoelectric element with mirror superstructures. The light's beam path can thus be changed with an electric control. Based on a configuration of this kind, a dynamic control of the vehicle headlight with optionally linearly polarized light or non-polarized light can be achieved using an individual light source as well as using a passive, stationary, fixed pre-installed polarization filter.

According to another advantageous embodiment, the vehicle headlight comprises a second light source, which is designed to exclusively generate linearly polarized light, whereby the light can either already be polarized due to the kind of physical generation, or the second light can be permanently coupled with a static polarization filter. In an embodiment of this kind, a particularly simple implementation of the embodiments is possible.

According to another advantageous embodiment, the vehicle headlight is designed, during normal operation of the vehicle headlight, to illuminate the surroundings continuously, especially with constant light output.

According to another advantageous embodiment, the vehicle headlight is designed, during normal operations of the vehicle headlight, to periodically switch between a first operating mode with emission of exclusively non-polarized light and a second operating mode with emission of at least one portion of pre-definable light output as polarized light. Advantageously, the vehicle headlight is designed overall to maintain consistent light output during this type of alternating operation between two operating modes, such that the sum of the polarized light and the non-polarized light in each of the two operating modes, the first operating mode and the second operating mode, leads to illumination of the surroundings with the same pre-definable light output, in particular with the same luminous flux. Thus, for a human observer, in particular a driver of the motor vehicle, no difference can be perceived between the first operating mode and the second operating mode.

According to another advantageous embodiment, the driver assistance system comprises an analysis unit, which is designed to compare the image data generated by the image capture unit in the first operating mode and the image data generated by the image capture unit in the second operating mode. Especially here it can be provided to perform a difference evaluation between the respectively generated image data, thus, to determine the difference between the two lighting situations with different proportions respectively of linearly polarized light to the total pre-definable light output. The evaluation of an image thus not only benefits from the image in polarized light, which leads to a reduction of the noise, but also a comparison of images in non-polarized lighting by evaluating the measured differences, thus increasing the accuracy of the image.

The difference evaluation, in this case, can be done pixel by pixel and/or on the basis of a correction of the shift of the image contents, which may be required, in particular, due to proper movement of the motor vehicle. In this case, for example, the two image data acquired at different times can be adapted to one another based on the distinctive image signatures and compared with one another based on a new raster, which does not necessarily match the original pixels.

According to another advantageous embodiment, the driver assistance system comprises a display device that is designed to receive the image data generated by the image capture unit and to display an image of the surroundings that depends on the image data. In particular, an image display of the surroundings is provided for a driver of the motor vehicle. By providing the image data to the driver of the motor vehicle using a screen, the improved visibility of the motor vehicle, if there is fog and water vapor in the atmosphere, can also be passed on to the driver and thus represents additional assistance for the driver.

A motor vehicle may preferably comprise the disclosed driver assistance system. The motor vehicle may have an internal combustion engine and/or an electric motor as a prime mover. In particular, the motor vehicle may be designed to provide automatic cruise control and/or tracking control.

According to another advantageous embodiment of the motor vehicle, the first polarization direction and/or the second polarization direction are orthogonal to a road surface on which the motor vehicle rests or rolls. As a result, in particular, reflections on a wet road surface, which mainly have a horizontal polarization direction, can be excluded from the evaluation.

This disclosure is further based on a method for operating a driver assistance system for a motor vehicle by illuminating the surroundings of the motor vehicle using a vehicle headlight and evaluating light with a pre-definable first polarization direction for generating image data as a function of the surroundings of the motor vehicle. The method is further refined during normal operations, whereby a pre-definable light output is provided by the vehicle headlight, generating linearly polarized light with a second polarization direction to illuminate the surroundings according to a pre-definable modulation pattern and/or with a pre-definable portion of the light output.

The advantages and preferred embodiments described for the driver assistance system disclosed herein also apply to the motor vehicle embodiments and, if applicable, vice versa. Likewise, the advantages and features and embodiments described for the device disclosed herein apply equally to corresponding methods, and vice versa. Consequently, corresponding method features can be provided for device features, and vice versa.

The features and feature combinations mentioned above in the description as well as the features and feature combinations shown below in the description of the figures and/or shown solely in the figures can be used respectively not only in the indicated combination but also in other combinations or alone, without departing from the scope of the invention. There are thus also embodiments to be regarded as disclosed that are not explicitly shown or explained in the figures, however, that are apparent and can be generated by a separate combination of features from the described embodiments.

Further advantages and features will become apparent from the following description of embodiments with reference to the accompanying figures. In the following figures, like reference numerals designate like features and functions.

Figure 1:
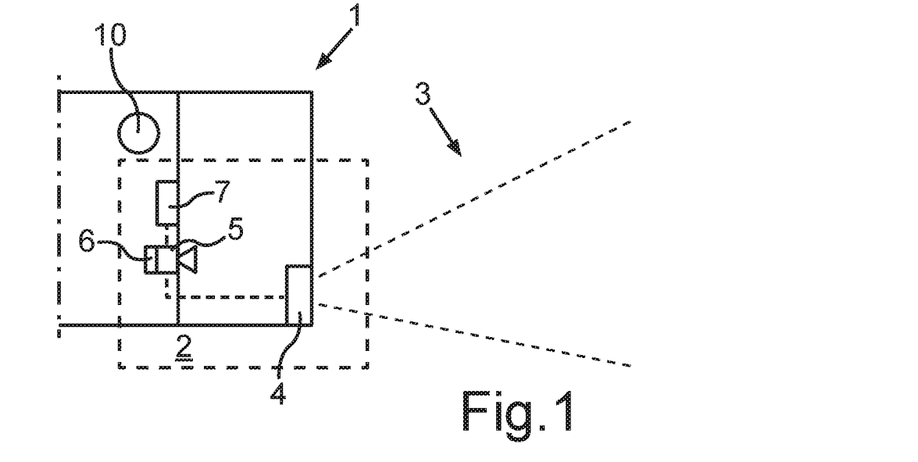
FIG. 1 illustrates a simplified schematic representation of a preferred embodiment of a motor vehicle.

FIG. 1 illustrates, in a simplified schematic representation, a preferred embodiment of a motor vehicle.

Figure 2:
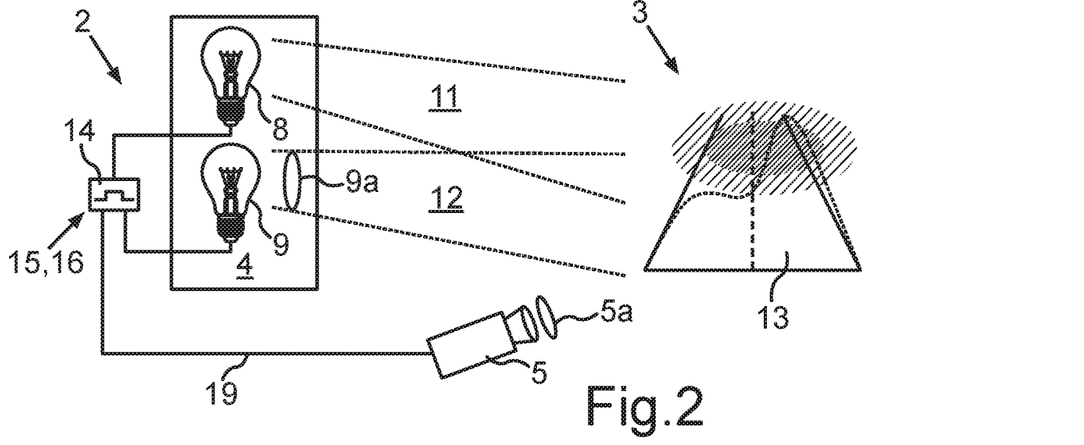
FIG. 2 illustrates a simplified schematic representation of a preferred first embodiment of a driver assistance system.

FIG. 2 illustrates, in a simplified schematic representation, a preferred first embodiment of a driver assistance system.

Figure 3:
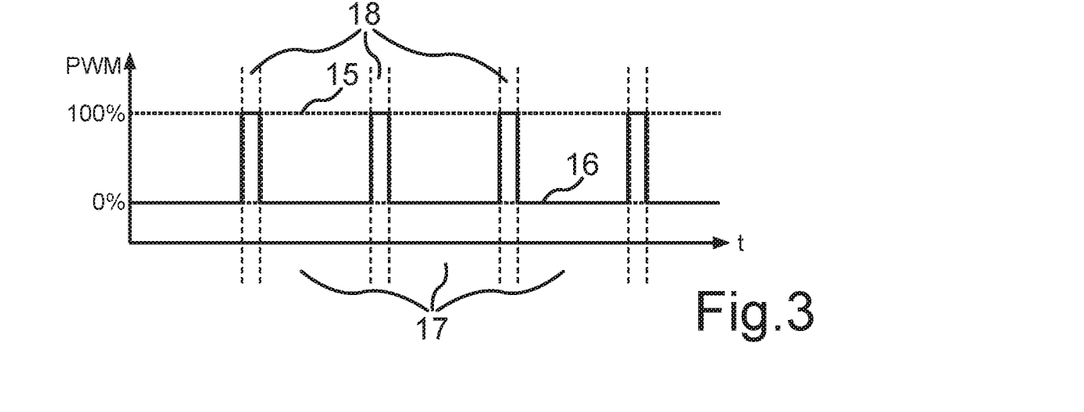
FIG. 3 illustrates a simplified schematic representation of a control scheme for use with the driver assistance system as shown in FIG. 2.

FIG. 3 illustrates, in a simplified schematic representation, a control scheme for use with the driver assistance system as shown in FIG. 2.

Figure 4:
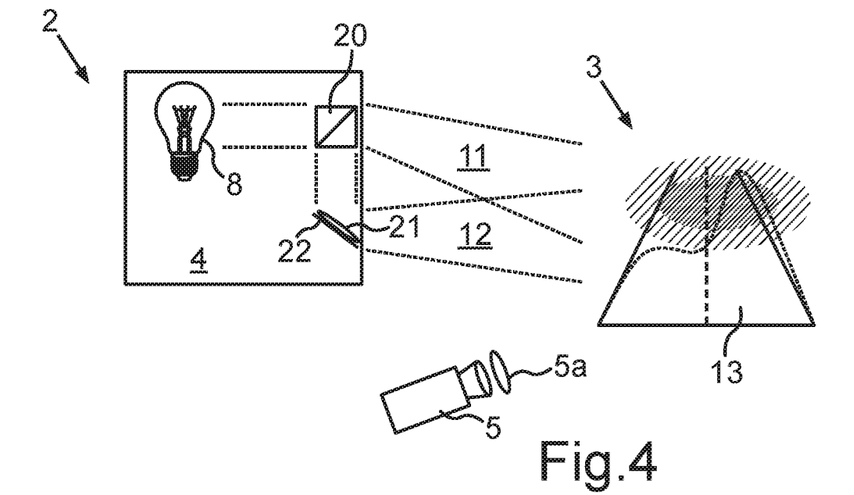
FIG. 4 illustrates a simplified schematic representation of a preferred second embodiment of a driver assistance system.

FIG. 4 illustrates, in a simplified schematic representation, a preferred second embodiment of a driver assistance system.

Figure 5:
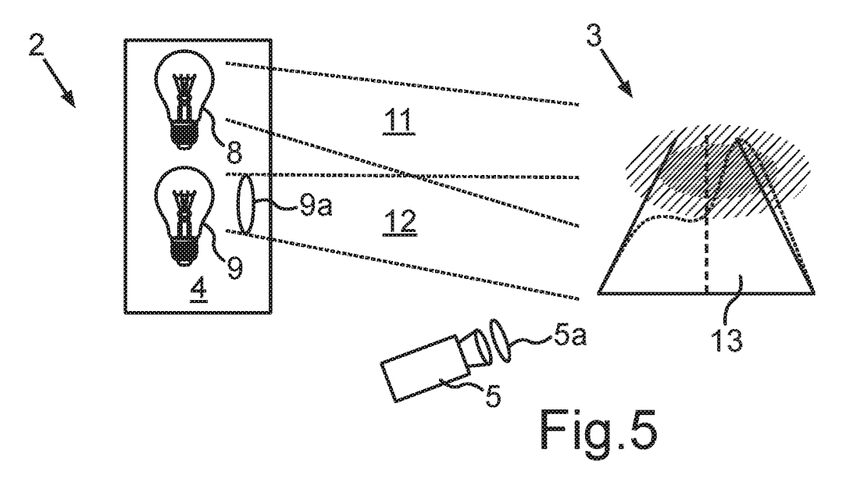
FIG. 5 illustrates a simplified schematic representation of a preferred third embodiment of a driver assistance system.

FIG. 5 illustrates, in a simplified schematic representation, a preferred third embodiment of a driver assistance system.

Figure 6:
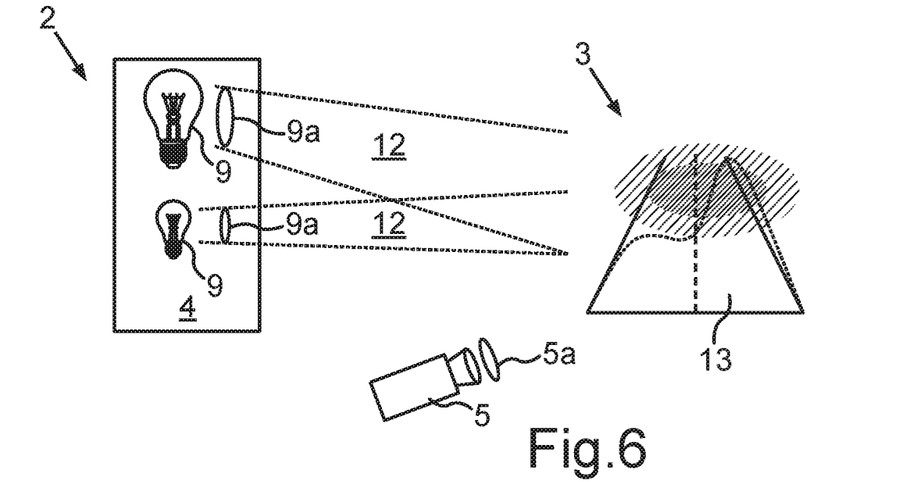
FIG. 6 illustrates a simplified schematic representation of a preferred fourth embodiment of a driver assistance system.

FIG. 6 illustrates, in a simplified schematic representation, a preferred fourth embodiment of a driver assistance system.

FIG. 1 shows a motor vehicle 1 according to a preferred embodiment, which may be, in particular, a passenger car. Motor vehicle 1 can also be a truck, bus, commercial vehicle, or other motor vehicle, for example. In front of the motor vehicle 1 are surroundings 3 monitored by a driver assistance system 2, which is illuminated by a vehicle headlight 4 from the driver assistance system 2. The driver assistance system 2 further comprises an image capture unit 5, which generates image data as a function of the surroundings 3 of the motor vehicle 1. The image capture unit 5 may in particular be a mono-camera, which is preferably arranged in the vicinity of an interior mirror of the motor vehicle 1. The image capture unit 5 is followed by an evaluation unit 6, which evaluates the generated image data and provides it for further processing by the driver assistance system 2. Optionally, the driver assistance system 2 may comprise a display device 7, which is accomplished in particular by a screen, which provides an image of the surroundings 3 to a driver 10 of the motor vehicle 1.

FIG. 2 shows a preferred first exemplary embodiment of the driver assistance system 2. The image capture unit 5 is equipped with a polarization filter 5a. The image capture unit 5 is aligned with the surroundings 3, in which a road surface 13 is shown. The vehicle headlight 4 comprises a first light source 8, which is designed to emit non-polarized light 11. Furthermore, the vehicle headlight 4 comprises a second light source 9, which is designed to emit linearly polarized light 12. For this purpose, the second light source 9 is equipped with a polarization filter 9a. The driver assistance system 2 also includes a control unit 14, which is designed to control the first light source 8 and the second light source 9. The activation of the first light source 8 and the second light source 9 takes place dependent on a first modulation pattern 15 and a second modulation pattern 16.

The first modulation pattern 15 is in this case associated with the operation of the first light source 8, and the second modulation pattern 16 is associated with the operation of the second light source 9. The activation of the two light sources, the first light source 8 and the second light source 9, as well as of the image capture unit 5, is synchronized by the control unit 14 via a synchronization link 19.

An exemplary control scheme for the control unit 14 is shown in FIG. 3. Here, the first modulation pattern 15 and the second modulation pattern 16 are shown as a function of a time t applied to the x coordinate. A pulse width modulation (PWM) is plotted on the ordinate, which assumes two states, namely 0 percent and 100 percent in the representation. In a first operating mode 17, the first modulation pattern 15 has a value of 100 percent and the second modulation pattern 16 has a value of 0 percent. In a second operating mode 18, these values are simply reversed, that is, the first modulation pattern 15 has a value of 0 percent and the second modulation pattern 16 has a value of 100 percent. In other words, according to the present illustration, the first light source 8 and the second light source 9 are each alternately operated at full power and alternately switched off completely. This control pattern is repeated cyclically, resulting in a periodic process. The resulting intervals, in which the first light source 8 without polarization illuminates the surroundings 3, in particular the road surface 13, generate the impression of a homogeneous light image for the driver 10. The duration of the intervals in which the polarized second light source 9 is activated is selected such that they can no longer be perceived by the driver 10. The image from the image capture unit 5 provided with the polarization filter 5a is synchronized with the polarized second light source 9. When activating the second light source 9, the first light source 8, in particular all other light sources from the vehicle headlight 4, can be deactivated. This corresponds to the control scheme according to FIG. 3. However, such a deactivation is not absolutely necessary, but in the second operating mode 18, it may also be provided to define a value different from zero (0) percent for the first modulation pattern 15 in the second operating mode 18.

According to a second preferred embodiment of the driver assistance system 2, as shown in FIG. 4, the vehicle headlight 4 comprises only a first light source 8, which is designed to emit both non-polarized light 11 and linearly polarized light 12. The reference numerals already known from FIGS. 1 and 2 apply accordingly and will not be explained separately below. In this case, the first light source 8 is not necessarily designed as a single light source, but rather, the first light source 8 is representative of a functional unit, if needed, of a plurality of individual light sources. For example, this may be one or more light-emitting diodes (LED) or one or more laser diodes.

The light emitted by the first light source 8 is changed using a mechanical element 20 in its beam path. The mechanical element 20 may be designed, for example, using a piezoelectric element with mirror structures. Likewise, it can be provided that a plurality of such mechanical elements are placed into the beam path. Using electrical activation, the mechanical element 20 changes the beam path of the light. Thus, non-polarized light 11 is emitted in the first operating mode 17, whereas in the second operating mode 18 the mechanical element 20 is controlled in such a way that the light is deflected onto a mirror 22, via which the beam path of the light is again redirected in the emission direction of the vehicle headlight 4. In its path according to the deflected beam path, the light generated by the first light source 8 passes through a polarization filter 21, which is provided, for example, in the vicinity of the mirror 22. This design of the polarization filter 21 as well as the mirror 22 are shown to explain the principle underlying this second embodiment and not to be construed as restrictive.

In synchronization with the image capture unit 5 of the motor vehicle 1, time intervals are defined in which only linearly polarized light 12 strikes the road surface 13, and these time intervals are recorded and evaluated separately by the image capture unit 5. In this way, snapshots result with a defined polarization direction of the light.

A preferred third exemplary embodiment of a driver assistance system 2 is shown in FIG. 5. In this case, the vehicle headlight 4 comprises a first light source 8 and a second light source 9, wherein the first light source 8 emits non-polarized light 11 and the second light source 9 emits linearly polarized light 12 through the polarization filter 9a. As already shown in the first exemplary embodiment, a further light source in the form of the second light source 9 within the vehicle headlight 4 is provided here in addition to the first light source 8, which may represent a main light source from the vehicle headlight 4. The light output provided by the second light source 9 is adapted to the entire driver assistance system 2 such that the image capture unit 5 is not over-illuminated by the non-polarized light 11. A polarization filter 5a is positioned in front of the image capture unit 5. In this structure, the first light source 8, for example, the high beam of the vehicle headlight 4, compensates for the loss of light output caused by the polarization filter 9a on the second light source 9. Thus, according to the third embodiment, the non-polarized light 11 and the linearly polarized light 12 are emitted statically to the surroundings 3 in a pre-defined composition.

Alternatively, it can be provided, according to the principle proposed in the first embodiment, to perform a combined activation of the first light source 8 and the second light source 9, in which they both switch alternately between the first operating mode 17 and the second operating mode 18, and the distribution between non-polarized light 11 and linearly polarized light 12 is not set exclusively at 0 percent or 100 percent, but rather, a freely pre-definable mixed ratio between linearly polarized light 12 and non-polarized light 11 is made possible. As a result, in particular, the total light output which is emitted onto the surroundings 3 can be correspondingly controlled in accordance with the brightness perceived by the driver 10, so that no difference between the first operating mode 17 and the second operating mode 18 can be detected. In this way, disturbing stroboscopic effects, as they are known in particular from a motor vehicle due to the proper motion of the motor vehicle, can be avoided. In a periodic illumination change, the ratio of the activation time between linearly polarized light 12 and non-polarized light 11 is not set at 1:1, but can be adjusted. The evaluation of the image not only benefits from the exposure to linearly polarized light 12, which leads to a reduction in the noise, but a comparison with images when illuminated with non-polarized light 11 can also increase the accuracy of the recording by extracting the measured differences.

A preferred fourth exemplary embodiment of a driver assistance system 2 is shown in FIG. 6. Here, both light sources of the vehicle headlight 4 are constructed according to the previous representations as second light sources 9, which each have a polarization filter 9a upstream. Thus, only linearly polarized light 12 is emitted from the vehicle headlight 4. This illuminates the surroundings 3 with the road surface 13 and can be interpreted by the image capture unit 5 provided with a suitable polarization filter 5a. The fourth embodiment can thus be regarded as a special (restrictive) case of the first three exemplary embodiments presented above. The first light source 8—for example, a high-beam source—is thus replaced by a second light source 9, so that no non-polarized light 11 is emitted by the vehicle headlights 4.

Of course, the two second light sources 9 shown separately do not necessarily have to be two separate components; rather, the vehicle headlight 4 can also have a single light source 9 (compare the illustration of FIG. 4 with an adjustment of the mechanical element 20, which permanently brings the polarization filter 21 into the beam path). Thus, the vehicle headlight 4 may include any number of light sources, which emit linearly polarized light 12 with a pre-defined polarization direction.

The polarization filter 5a in the beam path of the image capture unit 5 can be designed to be both statically and electrically controllable in each of the previously depicted exemplary embodiments. In the latter case, the incident light is only temporarily passed through a static polarization filter before it hits the image capture unit 5.

The embodiments are merely illustrative and are not restrictive. Thus, in particular, the type of generation of the polarized light and a time and/or amplitude-dependent composition of the light output as a function of the non-polarized light 11 and the linearly polarized light 12 can be designed arbitrarily, without departing from the spirit of this disclosure. In particular, in connection with a particular embodiment, disclosed features that are not necessarily limited to the particular embodiment, for example, a specific LED-based embodiment of the first light source 8 and/or the second light source 9, can be combined with the other embodiments.

Thus, it has been shown above how improved environment detection by means of polarized illumination can be enabled.

The invention claimed is:

1. A driver assistance system for a motor vehicle, the driver assistance system comprising:
   a vehicle headlight, configured to illuminate surroundings of the motor vehicle by providing a pre-definable light output, the vehicle headlight comprising:
      a first light source configured to generate a non-polarized light in a first operating mode, and
      a second light source configured to generate a linearly polarized light in a second operating mode; and
   an image capture unit, synchronized with the first light source and the second light source by a control unit over a synchronization link,
      wherein the image capture unit is configured to evaluate light in a pre-definable first polarization direction to generate image data in accordance with the surroundings of the motor vehicle, and
      wherein the vehicle headlight is further configured to:
         provide the linearly polarized light through the second light source with a second polarization direction, and
         operate the first light source and the second light source, each alternately fully switched on with full power and each alternately fully switched off, in a periodic, cyclical process, wherein one of the first light source and the second light source is fully switched on at a time.

2. The driver assistance system according to claim 1, wherein the second polarization direction is equal to the pre-definable first polarization direction.

3. The driver assistance system according to claim 1, wherein the image capture unit has a resolution of at least VGA resolution of at least 640 by 480 pixels.

4. The driver assistance system according to claim 1, wherein the image capture unit is further configured to capture colors for distinguishing regulatory signal colors used in traffic light installations.

5. The driver assistance system according to claim 1, wherein the image capture unit is further configured as a mono-camera to detect the surroundings illuminated by the vehicle headlight.

6. The driver assistance system according to claim 1, wherein the first light source is configured to exclusively generate the non-polarized light.

7. The driver assistance system according to claim 6, wherein the vehicle headlight comprises a polarization device configured to linearly polarize the non-polarized light generated by the first light source in response to a polarization control signal.

8. The driver assistance system according to claim 1, wherein the second light source is configured to exclusively generate the linearly polarized light.

9. The driver assistance system according to claim 1, wherein the vehicle headlight is further configured to maintain an overall constant light power when switching between the first operating mode and the second operating mode.

10. The driver assistance system according to claim 1, wherein the vehicle headlight is further configured, during normal operation of the vehicle headlight, to periodically switch between the first operating mode with a first emission of exclusively the non-polarized light and the second operating mode with a second emission of at least one portion of the pre-definable light output as the linearly polarized light.

11. The driver assistance system according to claim 10, further comprising:
an evaluation unit configured to compare first image data generated by the image capture unit in the first operating mode and second image data generated by the image capture unit in the second operating mode.

12. The driver assistance system according to claim 1, further comprising:
a display device configured to receive the image data generated by the image capture unit and to display an image of the surroundings in response to the image data.

13. A motor vehicle with a driver assistance system comprising:
a vehicle headlight, configured to illuminate surroundings of the motor vehicle by providing a pre-definable light output, the vehicle headlight comprising:
a first light source configured to generate a non-polarized light in a first operating mode, and
a second light source configured to generate a linearly polarized light in a second operating mode; and
an image capture unit, synchronized with the first light source and the second light source by a control unit over a synchronization link,
wherein the image capture unit is configured to evaluate light in a pre-definable first polarization direction to generate image data in accordance with the surroundings of the motor vehicle, and
wherein the vehicle headlight is further configured to:
provide the linearly polarized light through the second light source with a second polarization direction, and
operate the first light source and the second light source, each alternately fully switched on with full power and each alternately fully switched off, in a periodic, cyclical process, wherein one of the first light source and the second light source is fully switched on at a time.

14. The motor vehicle according to claim 13, wherein the second polarization direction is equal to the pre-definable first polarization direction.

15. The motor vehicle according to claim 13, wherein the vehicle headlight comprises:
a polarization device configured to linearly polarize the non-polarized light generated by the first light source in response to a polarization control signal.

16. The motor vehicle according to claim 13, wherein the vehicle headlight is further configured to maintain an overall constant light power when switching between the first operating mode and the second operating mode.

17. The motor vehicle according to claim 13, wherein the vehicle headlight is further configured, during normal operation of the vehicle headlight, to periodically switch between the first operating mode with a first emission of exclusively the non-polarized light and the second operating mode with a second emission of at least one portion of the pre-definable light output as the linearly polarized light.

18. The motor vehicle according to claim 17, the driver assistance system further comprising:
an evaluation unit configured to compare first image data generated by the image capture unit in the first operating mode and second image data generated by the image capture unit in the second operating mode.

19. The motor vehicle according to claim 13, the driver assistance system further comprising:
a display device configured to receive the image data generated by the image capture unit and to display an image of the surroundings in response to the image data.

20. The motor vehicle according to claim 13, wherein the pre-definable first polarization direction or the second polarization direction is orthogonal to a road surface on which the motor vehicle rests or rolls.

21. A method for operating a driver assistance system for a motor vehicle, the method comprising:
illuminating, by a vehicle headlight, surroundings of the motor vehicle with a pre-definable light output, the illuminating comprising:
generating, by a first light source of the vehicle headlight, a non-polarized light in a first operating mode; and
generating, by a second light source of the vehicle headlight, a linearly polarized light in a second operating mode;
evaluating, by an image capture unit, light having a pre-definable first polarization direction;
synchronizing, by a control unit over a synchronization link, the image capture unit with the first light source and the second light source, wherein the second light source provides the linearly polarized light in a second polarization direction;
alternately operating the first light source and the second light source, wherein the first light source is at full power and the second light source is switched off, or wherein the second light source is at full power and the first light source is switched off;

repeating the alternating operation of the first light source or second light source in a periodic, cyclical process; and generating, by the image capture unit, image data from the light having the pre-definable first polarization direction, as a function of the surroundings of the motor vehicle illuminated by the first light source or the second light source.

\* \* \* \* \*